UNITED STATES PATENT OFFICE.

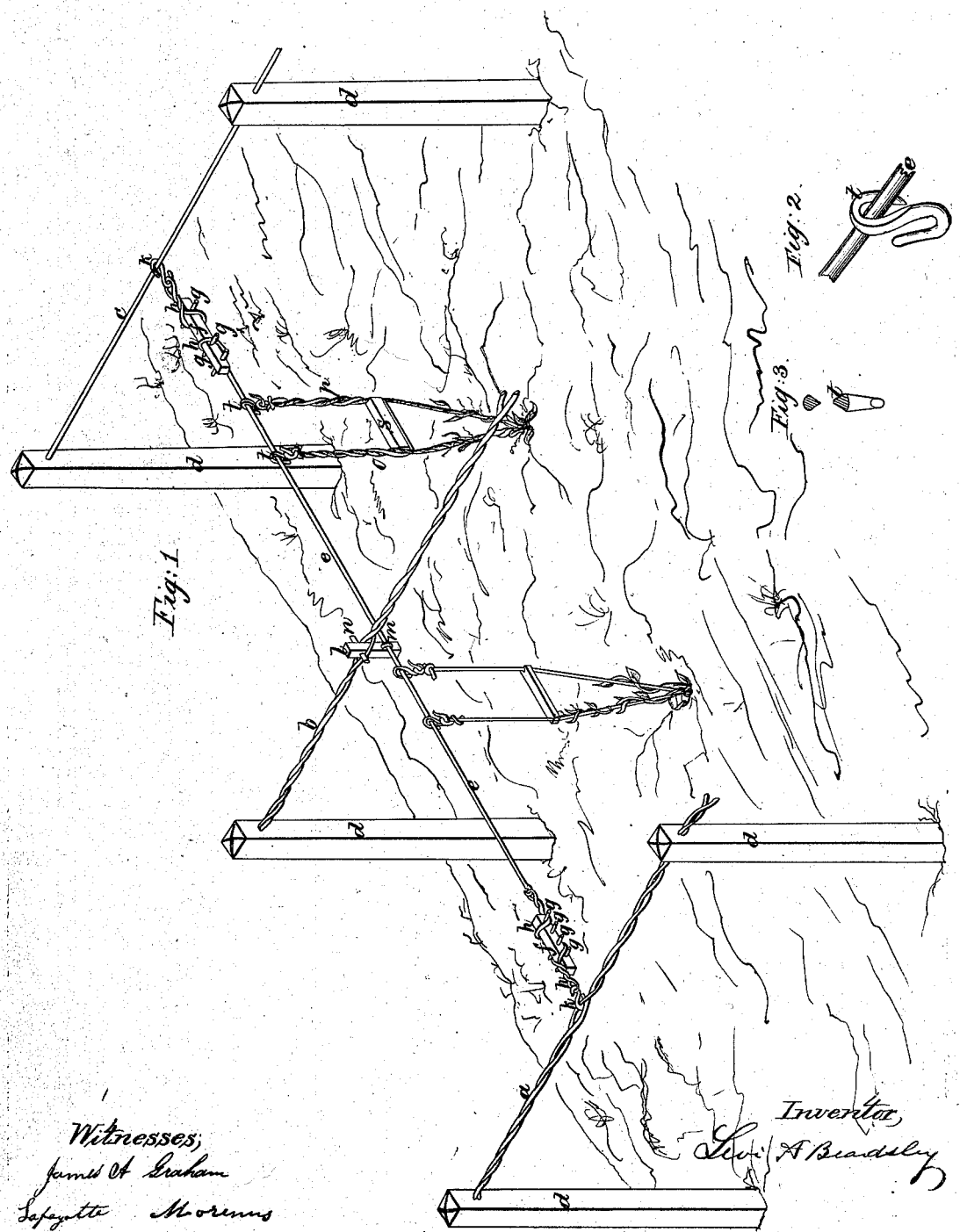

LEVI A. BEARDSLEY, OF SOUTH EDMESTON, NEW YORK.

IMPROVEMENT IN HOP-FRAMES.

Specification forming part of Letters Patent No. 35,291, dated May 20, 1862.

*To all whom it may concern:*

Be it known that I, LEVI A. BEARDSLEY, of South Edmeston, in the county of Otsego and State of New York, have invented certain new and useful Improvements in Hop-Frames; and I do hereby declare that the following is a full, clear, and exact description thereof, reference being had to the accompanying drawings, forming part of this specification, in which—

Figure 1 represents a perspective view of a portion of a hop-frame embodying my improvements. Fig. 2 is a perspective view of one of the hooks *t* and of a portion of the wire to which it is attached, and Fig. 3 is a transverse section of the hook *t*.

Similar letters of reference denote the same part in the several figures.

My invention relates to improvements in wire frames for sustaining hop-vines during their growth.

The first feature of my said invention relates particularly to wire hop-frames constructed in a method secured to me by Letters Patent dated September 3, 1861, in which a series of permanent horizontal wires sustain a series of horizontal detachable wires lying under and at a right angle with the first, and to which the upper ends of the training-cords are attached, having for an object to prevent extensive damage being done to the frame and the vines by lightning striking any one of the wires; and to this end the said leading feature of my invention consists in interposing insulators formed of wood or of other non-electic conducting material between the lower wires and the upper ones, which sustain them in such a manner that electricity will be prevented from passing from any of the lower to any of the upper wires, and consequently between any two of the lower; and my invention further consists in the employment of double training-cords or wires, in combination with a spreader arranged, substantially in the manner hereinafter described, so as to brace the cords apart and prevent in a measure their swaying and twisting by the action of the wind; and my invention also consists in forming the "training-cords" of wire intertwined with a fibrous strand or cord, in order that the "cords" may have the strength and stiffness of the wire, while at the same time they may afford a fibrous surface for the vines to cling to; and my invention also consists in the employment of a peculiarly-formed hook for the attachment of the training-cords to the horizontal wires, constructed substantially in the manner hereinafter set forth, for the purpose specified.

To enable others skilled in the arts to make and use my invention, I will proceed to a description thereof.

In the accompanying drawings, *a b c* are parallel permanent wires, attached to posts *d d*, and sustaining a series of parallel wires lying under and at right angles with them, one of which is shown at *e*.

*f e* are wooden insulators interposed between the ends of the wire *e* and the wires *a* and *c*. These insulators are in the form of a square bar, having several pins, *g*, thrust transversely through it, the two ends of which project on each side of the bar. The insulators *f* are attached to the wires by loops of wire *h*, which slip over the bar and are caught behind the ends of the pins *g*, the loops being secured to the wires by hooks *k*. The loops, by being made oblong, can be slipped over the bar and be turned so as to catch behind the ends of such of the pins *g* as will sustain the wire *e* at the proper height.

*l* is an insulator, formed of a bar of wood, to which the wire *e* is attached by a staple, *m*, and its weight sustained by a pin, *n*, passed through the bar and resting on the two strands of which the "wire" *b* is composed. This insulator *l* may, however, be attached to a single horizontal wire by a hook fastened in its upper end.

Each of the series of lower wires is provided with insulators, preventing their contact with the permanent wires, and all of them are therefore insulated from each other, so that the damage from a stroke of lightning will be confined to the part of the yard upon which it falls, and will not be conveyed to all the other parts by a continuous net-work of conducting-wires.

The training-cords, which lead from the ground to the horizontal wires, are in pairs, the two parts of which, *o* and *p*, are united at the ground, but are held apart by a spreader of wood, *s*, situated about midway between the ground and horizontal wires. Above this spreader or brace the cords *o* and *p* run parallel, and their upper ends are attached to the wire *e* by hooks formed somewhat in the shape of the Roman capital S. The inner edges of the upper half or loop of this hook *t* are sharpened, as shown in Figs. 2 and 3, so that when this part of the hook is closed upon the wire (see Fig. 2) the sharpened edges will indent the wire $e$ slightly, and the hook will thereby be prevented from slipping along the wire, while at the same time it will not be so rigidly interlocked with the wire as to prevent a slight tipping movement to accommodate any slight swaying of the the cords, and to some extent prevent their wearing off. The lower part or loop of the hook is smoothly rounded, so as not to cut the cord which is attached to it.

The diverging parts of the cords $o$ and $p$, held apart by the brace or spreader $s$, serve to brace each other and prevent too great swaying and twisting of the vines.

The "cords" $o$ and $p$ are formed of wire, with a hempen strand intertwined therewith, for the purposes hereinbefore stated.

Having thus described my invention, I disclaim the insulators except when in combination with series of horizontal wires running at a right angle with each other, as described. I also disclaim the use of an S-shaped hook unless the inner edge of one of its parts be angular or sharpened; but

What I claim as my invention, and desire to secure by Letters Patent, is—

1. The employment of electric insulators in combination with two series of horizontal wires running at a right angle with each other, substantially in the manner and for the purpose hereinbefore set forth.

2. The spreader $s$, in combination with the divergent training-cords $o$ and $p$, substantially as and for the purpose specified.

3. Forming the training-cords of wire intertwined with one or more fibrous strands, for the purposes specified.

4. The use of the hooks $t$, having a sharp or angular inner edge and otherwise constructed as described, for the purposes set forth.

LEVI A. BEARDSLEY.

Witnesses:
ORRIN ADAMS,
GEO. W. SUMNER.